United States Patent [19]

Silverman

[11] 4,282,587
[45] Aug. 4, 1981

[54] METHOD FOR MONITORING THE RECOVERY OF MINERALS FROM SHALLOW GEOLOGICAL FORMATIONS

[76] Inventor: Daniel Silverman, 5969 S. Birmingham St., Tulsa, Okla. 74105

[21] Appl. No.: 41,061

[22] Filed: May 21, 1979

[51] Int. Cl.³ ............................................. G01V 1/28
[52] U.S. Cl. ................................... 367/37; 367/14
[58] Field of Search .............................. 367/14, 37, 47

[56] References Cited

U.S. PATENT DOCUMENTS

| 2,803,305 | 8/1957 | Behning et al. | 367/37 |
| 2,973,811 | 3/1961 | Rogers | 166/254 |
| 3,302,164 | 1/1967 | Waters et al. | 367/75 |
| 3,474,878 | 10/1969 | Loren | 367/35 |
| 3,586,105 | 6/1971 | Johnson et al. | 166/250 |
| 3,739,871 | 6/1973 | Bailey | 367/37 |
| 3,805,587 | 4/1974 | Sayer | 367/37 |
| 3,921,126 | 11/1975 | Waters | 166/250 |
| 4,009,609 | 3/1977 | Sayer et al. | 367/14 |
| 4,044,828 | 8/1977 | Jones et al. | 166/250 |

OTHER PUBLICATIONS

Dennis et al., "Development of . . . Hydraulic Fractures in Dry Hot Rock," 5/27/76, pp. 97–107, Proc. 22nd Intern. Instrumentation Symp. San Diego, Calif.

*Primary Examiner*—Nelson Moskowitz
*Attorney, Agent, or Firm*—Daniel Silverman

[57] ABSTRACT

In the process of recovering minerals, such as hydrocarbons from shallow tar sands, and the like, one method is to create a shallow horizontal fracture within the tar sand. The size and shape of the perimeter is determined, and one or more secondary boreholes are drilled to the formation inside of the perimeter of the fracture. Pressurized air is injected into the fracture and the hydrocarbons are ignited. After a selected period of burning is carried out, the radius to the burn front, surrounding the recovery area, from which the hydrocarbons have been removed, is determined by placing a source of seismic waves at a selected point over the fracture, and a long array of seismic sensors colinear with the source.

The source is energized for different conditions of pressurization in the formation and fracture. The reflected seismic waves are converted to electrical signals, which are compared for all sensors. By comparison of the character and/or energy of the reflections, the geometry of the burn zone can be determined.

26 Claims, 5 Drawing Figures

U.S. Patent   Aug. 4, 1981   4,282,587
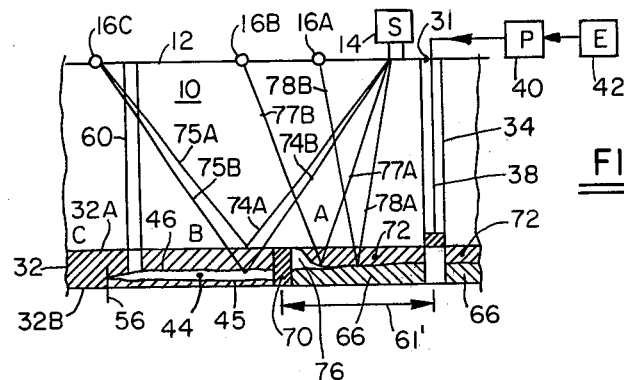
FIG. 4
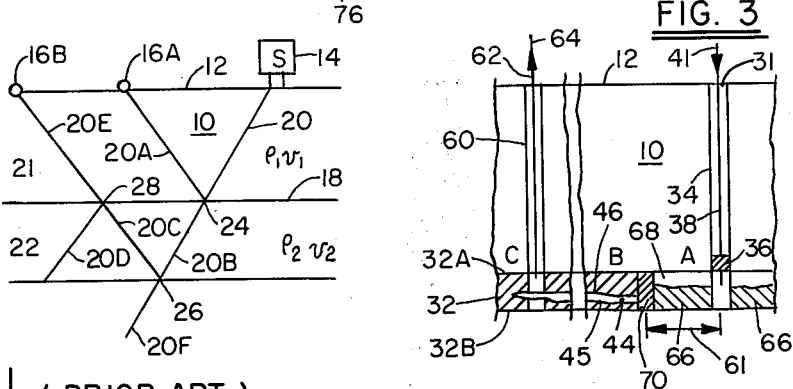
FIG. 1 (PRIOR ART)
FIG. 3
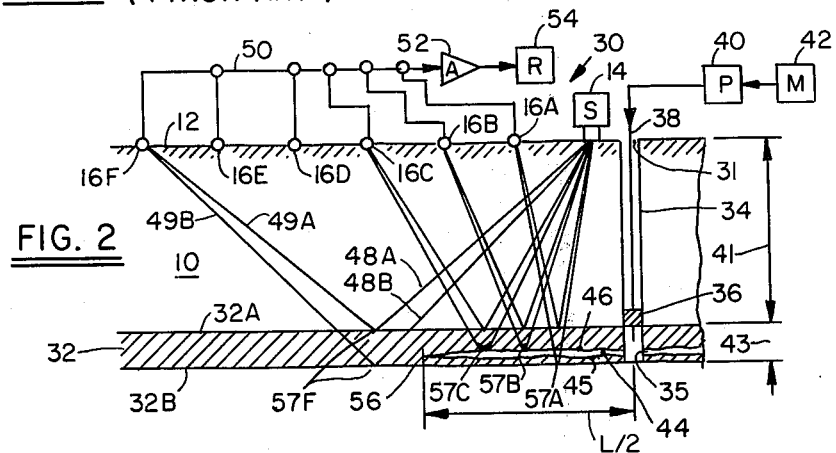
FIG. 2
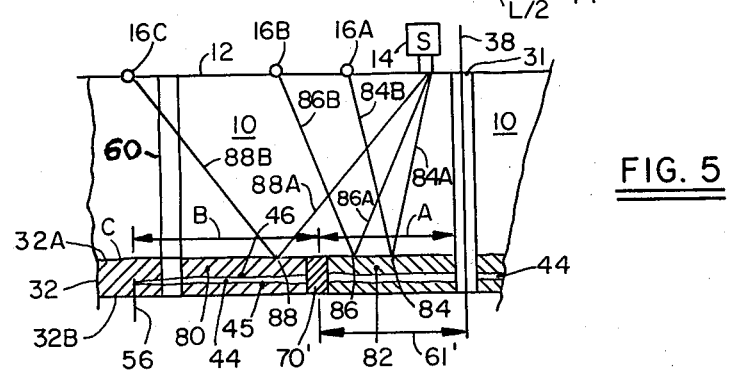
FIG. 5

METHOD FOR MONITORING THE RECOVERY OF MINERALS FROM SHALLOW GEOLOGICAL FORMATIONS

CROSS REFERENCE TO RELATED APPLICATION

This application discloses in part subject matter of my copending application, entitled: *Seismic Method of Mapping Horizontal Fractures in the Earth,* Ser. No. 41,060, which was filed in the United States Patent and Trademark Office on the same date as this application.

BACKGROUND OF THE INVENTION

1. Field of the Invention

This invention lies in the field of artificial fractures in the earth resulting from the application of fluid pressure, at a selected point, at a selected depth, in the earth, in a selected geologic formation, of selected properties.

More particularly this invention is related to the mapping of such fractures, that is, determining the horizontal shape and size of the outer perimeter of the fractures.

Still more particularly, this invention is concerned with the recovery of minerals, such as, hydrocarbons, from shallow geologic formations containing very viscous hydrocarbons, by heating the formations, by burning part of the hydrocarbons such as by injecting pressurized air, or by injecting high pressure steam.

Still more particularly, this invention is concerned with the mapping of the subsurface formations as the hydrocarbons are progressively removed from the formation.

2. Background of the Invention

In the petroleum industry over the past 25 years or so, it has been customary to artificially create fractures in the earth by means of fluid pressure applied at selected points in the earth. These processes have come to be known as hydrofracturing, or hydrofraccing, since liquids were the first fluids to be used. Liquids are still used in forming deep vertical fractures, where very high pressures are required.

On the other hand, where the hydrocarbon containing formation is shallow, and the fractures are horizontal, air or steam can be used to create the fractures, such as when creating fractures in shallow tar sands, for example.

However, in all the years that such artificial fracturing has been done, no satisfactory way has been found to precisely determine the azimuth, length and vertical extent of a deep vertical fracture, or the shape and dimension of the outer perimeter of a horizontal fracture.

In a related application, filed on the same date as this application, by M. Darroll Wood, entitled: *Method of Determining Change in Subsurface Structure Due to Application of Fluid Pressure to the Earth,* he has described a method of positioning tiltmeters on the surface of the earth over the expected position of the fracture, and by observing the variation of tilt of the earth, as a function of the pressure and flow rate of liquid into a deep vertical fracture, he is able to determine the azimuth of, and the horizontal extent of, the deep vertical fracture.

To applicant's knowledge, no other method has been described in the literature, for mapping artificial fractures in the earth.

SUMMARY OF THE INVENTION

The principal object of this invention is to devise a method for mapping artificial horizontal fractures in the earth by the seismic method.

It is a further object of this invention to determine the horizontal dimension and shape of the outer perimeter of a shallow horizontal fracture.

These and other objects are realized and the limitations of the prior art are overcome in this invention by creating a horizontal fracture in the normal manner, either by the application of pressurized liquid of gas, by processes which are well known in the art, and form no part of this invention.

A source of seismic waves, which can produce compressional waves, or shear waves, and can be impulsive or vibratory, as is well known in the art, is set up, at or near the surface of the earth, at a selected point, over the expected position of the fracture. At least one linear array of seismic sensors is positioned at or near the surface of the earth. The array is preferably colinear with the source, and should extend far enough, such that the point of reflection of the seismic waves from the source to a reflecting interface at or near the depth of the fracture, and to the sensors will be at a greater radius from the well bore from which the fracture was created, than the outer perimeter of the fracture.

Thus, of all the reflecting points to each of the sensors, some will be within, and some will be outside of the outer perimeter.

This source is energized in at least two conditions. A first condition P exists when the fracture is pressurized, so that the roof of the fracture is lifted, and out of contact with the base of the fracture, and the fracture is filled with fluid. A second condition N exists when the fracture is depressurized to a pressure less than that required to lift the overburden, so that the roof of the fracture will slump and will be in elastic wave transmitting contact with the base of the fracture.

Consider a sensor receiving a reflection from a reflecting point inside the perimeter. In the first condition P, with the fracture filled with fluid, the reflected signal will be of higher energy content than will the reflected signal from a point outside of the perimeter of the fracture, since there will be no fracture to augment the reflection of seismic energy.

In the second condition N, where the fracture is depressurized or nonpressurized, so far as the reflection of seismic energy is concerned, there is no fracture, and the reflection of seismic energy will be substantially the same at all reflection points.

A third condition, or situation, G, can be considered, where, the pressurizing of the fracture is done slowly, or gradually, or in a series of steps, of the flow of pressurizing fluid. In the third condition G, in effect, the perimeter of the fracture is growing, and the reflection points where substantial seismic energy is reflected move outwardly as the radius of the perimeter increases. Thus, this increasing size of the fracture can be mapped by the increasing number of sensors showing high energy. The radius of the fracture should be a function of the total fluid flow.

A fourth condition C and a fifth condition S, can be considered where the above procedure is repeated, first C, with a compressional seismic source, and then S, with a transverse shear seismic source. In the pressurized condition P, the compressional C, and shear S, reflections will be different, whereas in the depressurized condition N they will be similar.

Considerable work has been done on the recovery of hydrocarbons from shallow tar sands by burning part of the hydrocarbons to heat the formation, so that the hydrocarbons will soften and flow through the fracture to a secondary borehole and be recovered at the surface.

However, I am not aware of any satisfactory method fo mapping the progress of the burn front, to determine the fraction of the reservoir that has been recovered, or whether part of the reservoir is being by-passed by the burn front, and so on.

This invention is related to that problem, and is applicable to tar sands and hydrocarbon recovery by pressurizing with air and burning, or recovery by heating with high pressure steam. The invention is related also to the recovery of heavy (viscous) oil in the pores of consolidated porous rocks, by heating and/or burning. It is also applicable to the recovery of other minerals by solution, or chemical exolution, such as sulphur, salt, copper and so on.

It is therefor a still further object of this invention when the fracture is in a tar sand, for example, and the hydrocarbon is removed by heating the formation, such as by injecting steam into the fracture, or by injecting air under pressure and burning part of the hydrocarbons in the formation, to determine, at any selected time after the start of heating, the perimeter of the area of the formation from which the hydrocarbon has been removed.

These and other objects are realized and the limitations of the prior art are overcome in this invention by creating a horizontal fracture in the normal manner, either by the application of pressurized liquid or gas at a selected point at a selected depth in a tar sand, for example, providing a source of seismic waves, and can be impulsive or vibratory, and so on. One, or a plurality of radial arrays of seismic sensors are set out on the earth colinear with the source. The arrays are long enough such that the points of reflections of seismic waves from the source to the fracture, and upwardly to the sensors will extend to radii greater than the predetermined outer perimeter of the fracture.

Thus of all the reflecting points to each of the sensors, some will be within the mineral recovery zone A, inside of the burn front; some will be in the intermediate annular zone B between the burn front and the outer perimeter of the fracture, and a third outer part will be in the zone C, outside of the outer perimeter of the fracture.

The source will be energized for at least two conditions; condition P, where the formation is pressurized with a liquid or a gas, and condition N, where the formation is non-pressurized. In condition P, the roof of the fracture in zone B is lifted, and is out of contact with the base of the fracture; and in zone A, if the area is large enough, that the overburden has slumped into the recovery area, then in condition P this overburden will be lifted and the void will be filled with the pressurizing fluid, a liquid or preferably a gas.

On the other hand, in condition N, the fracture in zone B will be closed and reflections will look like those from zone C. Also, in zone A, the energy of the reflections will be less than in condition P.

BRIEF DESCRIPTION OF THE DRAWINGS

These and other objects and advantages, and a better understanding of the principles and details of the invention will be evident from the following description, taken in conjunction with the appended drawings, in which:

FIG. 1 is a prior art figure representing the transmission and reflection of seismic waves at geologic interfaces.

FIG. 2 illustrates schematically one embodiment of this invention.

FIG. 3 illustrates schematically one embodiment of the process of removing hydrocarbons from tar sands by burning, and mapping the burn front.

FIG. 4 illustrates the condition in FIG. 3 after a longer period of burning has been carried out and the burn front is at greater radius.

FIG. 5 illustrates the condition, similar to FIGS. 3 and 4 except that the mineral is held in the pores of a consolidated porous rock.

DESCRIPTION OF THE PREFERRED EMBODIMENT

The operation of the method of this invention will be better understood by reviewing briefly the principles of the transmission and reflection of seismic waves at geologic interfaces in the earth.

Referring to FIG. 1, which is fully taught in most text books on the seismic process of geophysical prospecting, the earth 10, having a surface 12 is shown having three geologic formations 21, at the surface, 22 below the formation 21, with an intervening contact or interface 18, and a third formation 23 in contact with 22, at an interface 19.

A seismic source 14 is set up at the surface, and a plurality of sensors, such as geophones 16A, 16B, etc. spaced from the source 14. By conventional representation, a ray of seismic energy 20 passes downwardly to reflection point 24 at the interface 18, where generally, part of the energy is transmitted across the interface 18 as ray 20B, and part is reflected as upwardly reflected ray 20A.

Again, at interface 19, part of the energy of ray 20B is transmitted at reflection point 26 across the interface 19 as ray 20F, and part is reflected upwardly as ray 20C.

Part of the upwardly travelling ray 20C at reflection point 28 is transmitted across the interface 18, from below as the ray 20E, and part is reflected downwardly as ray 20D, and so on.

There are several conditions that are well known. First, at the reflection point 24 for example, the angles of incidence and reflection, are equal. This occurs at all reflection points, such as 24, 26, 28 and so on. Second, the division of energy as between the incident wave and the reflected wave is given by the relation $$R = \frac{Ar}{AI} = \frac{\rho_2 V_2 - \rho_1 V_1}{\rho_2 V_2 + \rho_1 V_1}$$

where
R is the reflection coeefficient, or the ratio between the energy of the reflected wave, to the incident wave.
Ar is the energy of the reflected wave.
AI is the energy of the incident wave.
$\rho 1$ is the density of the formation 1 from which the wave is incident.
$\rho 2$ is the density of the formation 2, into which the wave is transmitted.

V1 is the velocity of seismic wave transmission in formation 1.

V2 is the velocity of seismic wave transmission in formation 2.

Of course the energy of the transmitted wave in formation 2 is given by $$At = AI - Ar.$$

The quantity $\rho V$ is called the acoustic impedance of a selected geologic formation. Such formations in the earth have independent densities, and velocities. Thus two different formations may have the same acoustic impedance, yet be considerably different in $\rho$ and/or V, and vice versa.

The reflection coefficients R are generally small, so that sufficient energy can be present in deep reflections, after having been traversing many hundreds or thousands of geologic interfaces.

However, where the reflection takes place between a solid and a liquid, because of the disparity in density and velocity the reflection coefficient can be quite large. Also where the interface is between rock and air, such as at the surface of the earth, the reflection coefficient can be almost 100 percent.

This invention makes use of these principles by comparing the energy of reflected seismic energy from the natural interfaces, such as 18, 19—where there is no fracture, to the case where there is a pressurized fracture filled with liquid or gas, where the reflection coefficient may be high.

Where the seismic source puts out a relatively simple wavelet, the "character" of the reflected seismic wave can be fairly simple. On the other hand, when the incident seismic wave is a long time function, as from a vibratory source, the "character" of the reflected wave can be very complex.

Also, where the seismic waves are shear waves which do not transmit through a liquid or gas the reflected energy can be very large.

Thus by making use of these principles and with the appropriate geometry and observing the character of the seismic waves and their energy, much information can be determined relating to the dimensions of the horizontal fracture.

Referring now to FIG. 2 there is shown schematically one embodiment of this invention, comprising a portion of the earth 10 including the surface 12. There is a well bore 34 drilled in conventional manner from the surface 12 to a depth 41 to and preferably through a geologic formation 32. Such a formation may be, for example, a shallow formation which contains hydrocarbons in the form of tar or very heavy (viscous) oil. For the purpose of recovery of these hydrocarbons a fracture 44 is produced in the body of the formation 32, preferably near the bottom thereof.

Not shown is one or a plurality of secondary boreholes drilled into the formation 32. These must be within the perimeter of the fracture indicated at a radius 56 equal to L/2 from the borehole 34.

The need to have the secondary boreholes in direct communication with the fracture indicates the need to know the precise position of the perimeter at 56. Also the secondary boreholes must be positioned as close to the perimeter as possible to be able to recover all the hydrocarbons within the perimeter.

A fracture fluid is passed down a tubing 38 inside the borehole 34, which is generally lined with casing. A packer 36 is set above the desired depth of fracture and the casing is perforated, 35 at the desired depth of the fracture. The pressurized fluid can be gas or liquid which is pressurized by pump or compressor 40 driven by motor 42.

a source of seismic waves 14 is set up at a selected point, preferably near to the center of the perimeter of the fracture 44, that is, near the mouth 31 of the well bore 34.

An array of a plurality of sensors or geophones 16 is laid out at or near the surface 12 of the earth. This array preferably consists of at least one linear array, colinear with said source. The array is long enough so that at least the outermost sensor 16F will receive reflected seismic waves from a point 57F beyond the outer perimeter 56 of the fracture 44.

Each of the geophones or other sensors 16A, 16B, ... 16F are each connected by conductors 50 in a conventional manner to a plurality of conventional seismic amplifiers 52 and to a storage, recording means, and/or display 54, as is well known in the seismic art.

The source may provide an impulsive seismic wave, or a vibratory seismic wave, which, passing downwardly into the earth, will reflect from the interfaces 32A and 32B and to each of the sensors 16.

When the fracture is depressurized, condition N, the roof of the fracture will fall into contact with the base. In this condition there will be very little, if any, energy reflected at the fracture plane, though there well may be reflections from the top and bottom interfaces 32A, 32B of the formation 32. These will combine to produce a reflection of a particular character, dependent on the reflection coefficients and spacing between the interfaces, etc.

Now, when the fracture is pressurized with a fluid, condition P, so that the roof 46 of the fracture 44 is clearly separated from the base surface 45 of the fracture there will be seismic reflections possible from the roof 46 and possibly the base 45, which reflections will add to those from the interfaces 32A, 32B, to produce a reflection character which is still more complicated, than in the previous case. There will also be increased amplitude and energy of the reflected waves.

However, only those sensors such as 16A, 16B, 16C for which the reflection points are at a radius from the source 14 which is less than the perimeter radius L/2 will show a large change of energy or character. For those sensors such as 16F for which the reflection point 57F is at a greater radius than L/2 of the perimeter 56 there will be substantially no change in the reflected energy or character received and recorded.

By comparing the character and energy of the reflected signals received by the sensors 16A, 16B, 16C, for the two conditions P and N of pressurization, it will be seen that the perimeter is beyond the radius 57C of the reflection point showing changes in character and energy. And, of course, if the perimeter is at a lesser radius than that of reflection point 57F of the sensor 16F, it will show no change.

It is thus seen that by using as close a spacing between sensors as desired, the radius of the perimeter 56 can be determined as precisely as desired.

It will be clear that if the fracture is pressurized at a slow rate, that is, low rate of fluid flow, that at a partial pressurization, the radius of effective separation of the roof and base of the fracture will exist only over a small radius. Then, as more fluid is pumped into the fracture the effective area of the roof that is lifted will increase, until, at full pressurization the effective perimeter will move to point 56.

Of course, at each stage, when the perimeter radius is less than L/2 there will be fewer sensors with reflection points inside the "then" perimeter, and showing the character and energy changes. Then as the perimeter moves out to 56 more of the sensors out along the array will show the character and energy change.

Since high frequency seismic signals can better delineate closely spaced interfaces, I prefer to use high frequency seismic waves. Also, I prefer to use transverse shear waves, particularly when the pressurizing fluid is a liquid or a gas. Also, I prefer to use an array of sensors which includes a plurality of radial arrays directed at spaced angular positions, to determine the shape of the perimeter.

What has been described is a novel procedure for determining the size and shape of the perimeter of a horizontal fracture in the earth, which utilizes a selected pressurizing procedure, in conjunction with the use of seismic surveying techniques.

Since the reflecting action at the fracture when pressurized with liquid or gas, would be different with compressional waves than with transverse shear waves, I propose to repeat the operations for both types of sources and sensors, for all conditions of pressurization, depressurization, and gradual pressurization.

Referring now to FIG. 3, there is shown the central portion of FIG. 2 at a selected time period after the formation 32 has been pressurized with air and the hydrocarbons have been ignited. A circular burn front 70 has been formed. The temperature is very high, and there is active combustion of the hydrocarbons as the hydrocarbon material is consumed in the formation 32, starting at the borehole 34. The remaining sand, cleaned of carbonaceous material, will fall 66 to the base 32B of the formation 32. When the radius 61 of the burn zone 70 is small, the roof at interface 32A, and the overburden 10 will not slump. Thus a void space 68 will remain, filled with pressurized liquid or gas. Thus, when a reflection point lies in zone A, and the formation is pressurized, the energy of the upward reflections will be high.

In zone B between the burn front 70 and the outer perimeter 56, the action will be similar to that in FIG. 2, inside of the outer perimeter 56, except that the fracture 44 will now be filled with a combination of liquid hydrocarbons and a gas, instead of solely gas as in FIG. 2.

Now consider FIG. 4, which represents a later time than that of FIG. 3, and the burn zone 70 has advanced to a larger radius 61', such that the overburden 72 above interface 32A has slumped into the void 68. Thus, the reflections from points in zone A inside the burn front will show large high energy reflections when the formation is pressurized, condition P, and low energy reflections when the formation is depressurized, condition N.

The reflections in zone B, between the burn front 70 and the perimeter 56 should be about the same for the condition in FIG. 4, as in the case of FIG. 3. And, of course, the reflections in zone C should be the same for FIGS. 2, 3 and 4.

There is a particular situation in the small area in zone A, just inside of the burn front 70. This is labelled 76. It comprises a narrow annular space, above which the overburden 10 is cantilevered over the void 68, although the main central part of the burned-out zone 72 has slumped.

For a reflection point within the radius of space 76, the reflections should be high for both conditions P and N, similar to those from zone A in FIG. 3.

While FIGS. 3 and 4 were drawn for the case of tar sands with hydrocarbon removal by heating, using the heat of combustion of the tar and the pressurized air. However, it is also possible to heat the formation with high pressure steam, which will condense after giving up its heat of vaporization.

The heat supplied by the steam will first be given up close to the borehole 34. When this zone A becomes heated enough, the tar will liquify and drop down into the fracture, and, along with the hot water condensate will flow outwardly, under pressure of the steam injected, to carry these liquids out to the secondary boreholes, where they will flow to the surface, and the hydrocarbons will be recovered.

It is to be expected that there will be a hot zone, 70' corresponding to the burn front 70, which, dependent on the rate of flow of steam, will move outwardly as a narrow annular zone. In the zone A inside of this hot zone, the sand will be substantially freed of tar, and will slump 66, as in FIGS. 3 and 4. Thus, the procedures described in connection with FIGS. 3 and 4 could be substantially the same for the recovery process using steam.

The differences between FIGS. 3 and 4 lie in the nature of the tar sand, namely that it is an unconsolidated rock, and when the tar is driven off, the loose sand will pile up in the bottom of the formation leaving a void above. Also the overburden will most likely slump, when the diameter of the cleared area is large enough.

There is another large area of this type of recovery system, and that is in the recovery of viscous hydrocarbons in the pores of consolidated porous rocks. In the case of these formations, the permeability is extremely low because the pores are filled with thick oil. Thus, it is necessary to produce a fracture so that the heating fluid can get into the formation, and out.

FIG. 5 has been drawn on the same basis as FIG. 4, but for the case of competent porous rock. Thus there will be no slumping in zone A in FIG. 5 as in FIG. 4. The reflection from reflection points 84, 88 in FIG. 5 won't respond to pressurization as they did in FIG. 4. Once all the oil is removed from the pores of saturated rock 80 as in zone B, it will be a gas or water filled porous rock 82, as in FIG. 5. The same types of field procedures would be followed in the case of FIG. 5 as in the case of FIG. 4.

The schematic diagram of FIG. 5 can be used to illustrate other types of mineral recovery, such as, for example, the case of sulphur recovery, or the recovery of any minerals that lie in the pores of the rock. For the recovery of salt or other minerals, the process might be better represented by FIGS. 3 and 4, without the sand, and so on.

While I have described my invention in relation to processes concerning the recovery of hydrocarbons from relatively shallow geologic formations, they can be applied equally well to the recovery of other minerals, either in unconsolidated formations, or in the pores of competent rock.

Some of the recovery processes might use pressurized gases, such as air or steam. Others, such as that in in situ mining of salt will involve the use of water, or in other liquids. Then there is still another category of minerals, the recovery of which can be accomplished by chemical processes, such as the use of acids, etc.

While I speak of horizontal and shallow geologic formations, these processes can be carried out at any depth at which a horizontal fracture will preferentially form (rather than a vertical fracture, for example). Also, since it is well known how to obtain seismic reflections from dipping formations, my method can be used where the formations are dipping at angles to the horizon small enough, so that the overburden can be lifted by the pressurized fluid, and lowered when that fluid is removed.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim, including the full range of equivalency to which each element thereof is entitled.

I claim:

1. In a mineral recovery operation including a shallow substantially horizontal geological formation containing said minerals a first borehole drilled to said formation, a substantially horizontal fracture in said formation resulting from the prior application of pressurized fracture fluid to said formation through said first borehole, a second borehole drilled to said formation at a selected radius from said first borehole less than the radius of the outer perimeter of said fracture, said mineral adapted to be removed from said formation by flowing a selected recovery fluid downwardly through said first borehole, outwardly through said fracture to said second borehole and upwardly to the surface; where said minerals are recovered; the method of mapping at a plurality of points at different radii, the shape and size of the zone in said formation, surrounding said first borehole, from which said mineral has been removed after said recovery fluid has been flowing for a first selected time interval T1, comprising the steps of;
  (a) providing a first source of seismic waves at or near the surface at at least one point above said fracture;
  (b) positioning at or near the surface of the earth a plurality of seismic sensors, such as geophones, at selected known positions, said sensors adapted to receive the upward reflection of downwardly directed seismic waves generated by said source, and to convert them to electrical signals;
  (c) pressurizing said previously prepared fracture with a selected pressurizing fluid to a condition P, where the overburden is lifted and the roof of said fracture is out of contact with the base of said fracture, and at least a thin layer of said pressurizing fluid fills said fracture and said cavity;
  (d) operating said first source and receiving said seismic waves reflected from the roof of said fracture and said zone and recording a first electrical signal from each of said sensors; and
  (e) comparing said first electrical signal from at least two of said sensors.

2. The method as in claim 1 including the additional steps of;
  (f) depressurizing said formation to a condition N where the pressure of said pressurizing fluid is less than that required to lift the overburden, whereby said fracture will close and said roof and base of said fracture will be in seismic wave transmitting condition;
  (g) repeating step (d) with a second source to provide a second electrical signal from each of said plurality of sensors; and
  (h) comparing said second electrical signals from at least two of said sensors.

3. The method as in claim 2 including the additional step of;
  (i) comparing said first and second electrical signals from at least one of said sensors.

4. The method as in claim 1 in which said step of comparing said electrical signals comprises the step of; determining whether a function of energy of said electrical signals from said sensors is greater from one than from another of said sensors.

5. The method as in claim 1 in which said step of comparing said electrical signals comprises the step of; determining whether the character of said electrical signals from said sensors is different from one than from another of said sensors.

6. The method as in claim 3 in which said first and second sources are sources of shear waves.

7. The method as in claim 3 in which said first and second sources are sources of transverse shear waves.

8. The method as in claim 3 in which said first and second sources are sources of compressional waves.

9. The method as in claim 1 in which said array of geophones is a radial array.

10. The method as in claim 1 in which said pressurizing fluid is a gas.

11. The method as in claim 1 in which said pressurizing fluid is a liquid.

12. The method as in claim 3 in which said first source is a shear source and said second source is a compressional source.

13. The method as in claim 1 in which said pressurizing fluid is the same fluid as said recovery fluid.

14. The method as in claim 1 in which said geological formation is a tar sand formation, and said recovery fluid is pressurized air, and including the additional step of igniting said hydrocarbon tar;
  whereby part of said hydrocarbon tar will burn and heat said formation, and the remaining hydrocarbons will soften and flow out through said fracture to said second borehole and be recovered.

15. The method as in claim 1 in which said geological formation is a tar sand formation, and said recovery fluid is high pressure steam;
  whereby said steam will heat said formation causing said hydrocarbon tar to soften and flow out through said fracture to said second borehole and be recovered, driven by the flow of hot condensate and the steam.

16. The method as in claim 1 in which said geological formation is a formation comprising a consolidated porous rock with the pores holding a viscous oil; and said recovery fluid is high pressure steam;
  whereby said steam will heat said formation causing said viscous oil to become less viscous and flow out through said fracture to said second borehole and be recovered.

17. The method as in claim 1 in which said geologic formation carries a solid mineral in the form of an ore body in a cavity within the formation.

18. The method as in claim 17 in which said solid mineral is sulphur and said recovery fluid is pressurized steam and hot water.

19. The method as in claim 17 in which said solid mineral is salt, and said recovery fluid is water.

20. The method as in claim 17 in which said solid mineral is a metal ore and said recovery fluid is a selected acid.

21. The method as in claim 1 for which the time duration of flow recovery fluid is T2, where T2 is a longer time interval than T1;

whereby the radius of said cavity in said formation will be greater at time T2, than at time T1; and including the additional step of comparing said first electrical signal from at least two of said sensors; for said times T1 and T2.

22. The method as in claim 1 for which the time duration of flow of recovery fluid is T2, where T2 is a longer time interval than T1, and including the additional step of;

comparing said first and second electrical signals from at least one of said sensors, for said times T1 and T2.

23. The method as in claim 1 in which the comparison of said first electrical signal from at least two of said sensors comprises, comparison of the amplitudes of the reflections from the top interface of said fracture.

24. The method as in claim 1 in which the comparison of said first electrical signal from at least two of said sensors comprises, comparison of the amplitudes of the reflections from the top interface of said geological formation.

25. The method as in claim 1 in which said selected source is one that provides a band of seismic frequencies at or near the upper end of the band of frequencies provided by conventional seismic sources.

26. The method as in claim 3 in which said formation is a tar sand, and the time duration of flow of said recovery fluid is long enough, and said zone is large enough, such that the overburden has slumped, and when the fracture is depressurized the roof of said zone is in contact with the base of said zone, except for a narrow annular portion of said zone at the inside edge of the annular burn front; and including the additional steps of:

(a) placing an array of sensors at such a radius from said first borehole that they will receive reflected seismic waves from said annular portion of said zone at the top interface of said formation; and (b) comparing the amplitudes of said second signals from said sensor array.

* * * * *